O. D. SPALDING
Car-Axle.
No. 210,814. Patented Dec. 10, 1878.
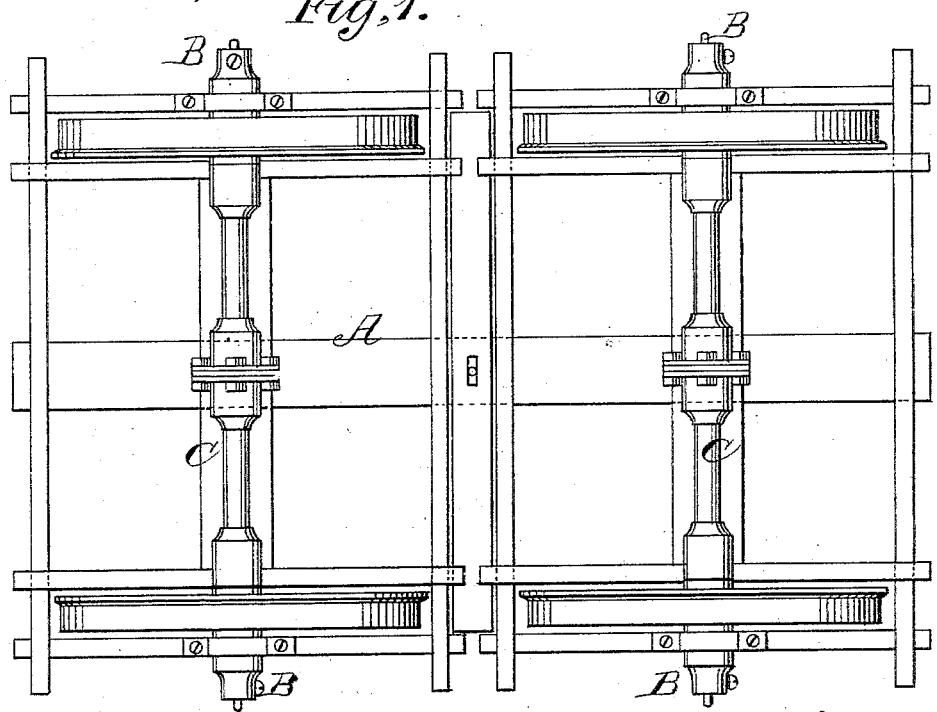
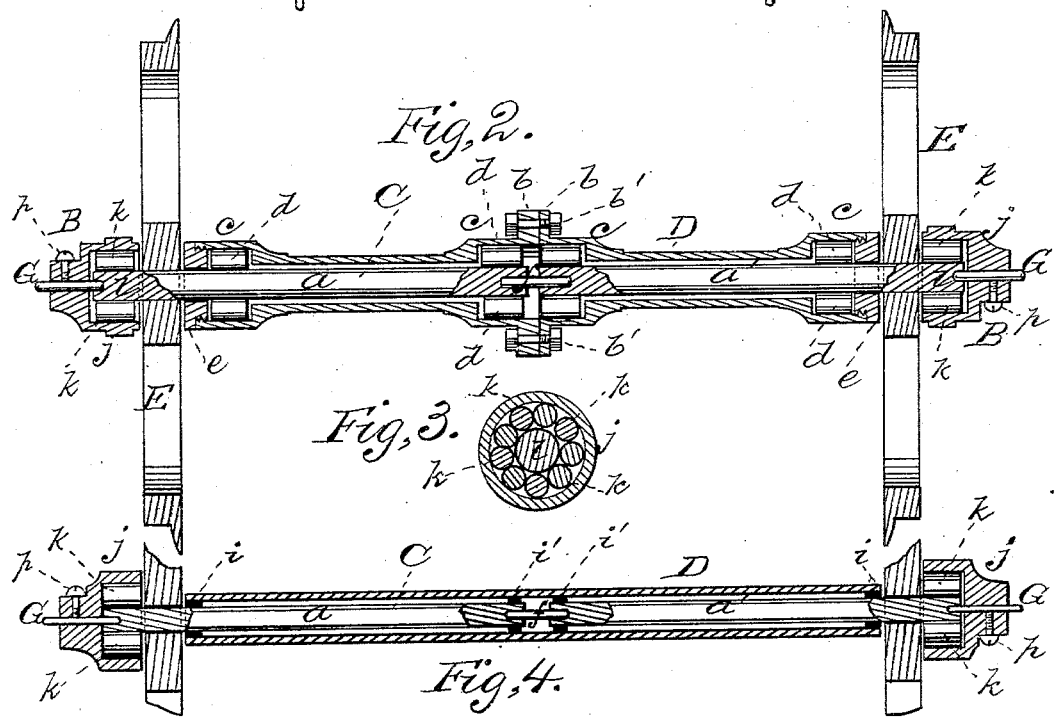
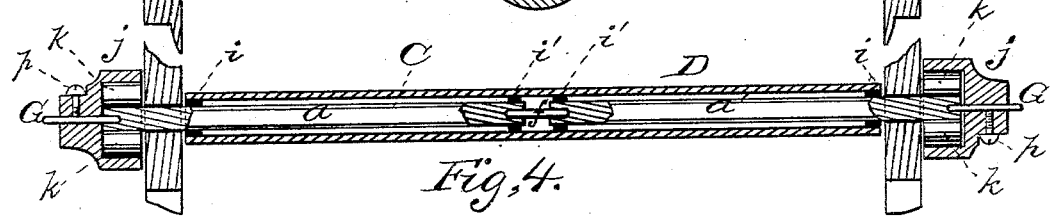
WITNESSES
Villette Anderson
F. J. Masi
INVENTOR
Orlando D. Spalding,
by E. W. Anderson
his ATTORNEY

UNITED STATES PATENT OFFICE.

ORLANDO D. SPALDING, OF MITCHELL, IOWA, ASSIGNOR OF ONE-HALF HIS RIGHT TO ROBERT W. BARNETT, OF SAME PLACE.

IMPROVEMENT IN CAR-AXLES.

Specification forming part of Letters Patent No. 210,814, dated December 10, 1878; application filed November 2, 1878.

*To all whom it may concern:*

Be it known that I, ORLANDO D. SPALDING, of Mitchell, in the county of Mitchell and State of Iowa, have invented a new and valuable Improvement in Car Wheels and Axles; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a bottom view of my improved truck. Fig. 2 is a longitudinal section of the axle and sleeve. Fig. 3 is a detail view of the axle-box, anti-friction rollers, and axle in section; and Fig. 4 is a section of a car-axle, showing a modification.

This invention has relation to improvements in railway-car trucks.

The object of the invention is, mainly, to provide a cheap and reliable means whereby the wheels on each side of a truck will be allowed to work independently of each other and of those on the other side of said truck, thereby preventing the slipping of the car-wheels and the twisting of the axle.

The nature of the invention consists in combining with a tubular sleeve, having bearings at its ends and at each side of the center of its length, independent axle-sections included in said sleeve and rotating on said bearings, and chambered pedestals, having anti-friction rollers therein, that afford rolling bearings to the journals of the axle-arms, as will be hereinafter more fully explained.

In the annexed drawings, the letter A designates a railway-car body, and B the pedestals depending therefrom and affording bearings to the spindles of a railway-car axle, C. This axle is composed of two sections, $a\, a'$, inclosed within a metallic sleeve, D, and having each a transporting-wheel, E, applied thereon in the usual manner. The axle-sections revolve independently of each other upon the annular bearings $i\, i'$, arranged inside of the sleeve, the ones in close proximity to the wheels, and the others near the ends of the said axle-sections. When this construction obtains, the sleeve will be made in one piece and extend from wheel to wheel; but, if I so elect, I may form the sleeve in two sections, having at their inner ends the flanges $b$, by means of which and suitable through-bolts $b'$ the said sleeve-sections are rigidly connected together. These sections have at each end an enlarged chamber, $c$, in which are arranged a sufficient number of rollers, $d$, to afford a rolling bearing to the axle-sections $a\, a'$. Usually the rollers are arranged in the chambers $c$ around the axle, and confined therein by means of a screw-cap, $e$. In either case the adjacent ends of the axle-sections will be kept apart by means of a stout bolt, $f$, the ends of which are loosely engaged in recesses in the ends of the said sections.

The spindles or journals extend out beyond the wheels E to enter the chamber $j$ of the pedestals B aforesaid. These chambers are cylindrical in section, and of sufficient size not only to admit the spindle $l$, but also a number of anti-friction rollers, $k$, arranged side by side, and, with the spindle, completely filling the said chamber, as shown in Fig. 3. Rolling bearings are thus afforded to the journals of the axles, by which friction is greatly lessened, and, as the axle-sections revolve independently of each other, the wheels also rotate independently of each other, and in turning curves neither slip upon the track nor twist the axle-trees, by which means all danger of causing flat wheels is prevented, and of breaking the axle effectually obviated.

G indicates a strong pin, extending through the box of the pedestal and engaging a recess in the end of the journals. This pin is confined to its place by means of a set-screw, $p$, extending through the walls of the box and bearing with its end against the said pin. This pin is a substitute for the collar on the end of the journal, and carries the strain from the outside ends to the center of the axle, thus greatly reducing the friction.

What I claim as new, and desire to secure by Letters Patent, is—

1. The combination, with the sleeve D and the axle-sections $a\, a'$, separated by a pin, $f$, of the pedestals B, anti-friction rollers $k$, recessed therein and affording bearings to the axle-journals $l$, the pins G, and set-screw $p$, arranged and operating substantially as specified.

2. The combination, with the tubular sleeve D, having bearings at its ends and at each side of the center of its length, of the axle-sections $a\ a'$, included in said sleeves and rotating independently on said bearings, the spacing-pin $f$, the transporting-wheels E, secured on the said axle-sections, the box-pedestals B, having chambers formed therein, the anti-friction rollers $k$, pins G, and set-screws $p$, all arranged and operating substantially as specified.

In testimony that I claim the above I have hereunto subscribed my name in the presence of two witnesses.

ORLANDO DEMIS SPALDING.

Witnesses:
　J. A. WENTWORTH,
　WILSON MARTIN.